(12) United States Patent
Croxford et al.

(10) Patent No.: US 10,509,743 B2
(45) Date of Patent: Dec. 17, 2019

(54) TRANSFERRING DATA BETWEEN MEMORY SYSTEM AND BUFFER OF A MASTER DEVICE

(71) Applicant: ARM LIMITED, Cambridge (GB)

(72) Inventors: Daren Croxford, Swaffham Prior (GB); Sharjeel Saeed, Cambridge (GB); Quinn Carter, Ontario (CA); Michael Andrew Campbell, Waterbeach (GB)

(73) Assignee: ARM Limited, Cambridge (GB)

( * ) Notice: Subject to any disclaimer, the term of this patent is extended or adjusted under 35 U.S.C. 154(b) by 238 days.

(21) Appl. No.: 15/612,072

(22) Filed: Jun. 2, 2017

(65) Prior Publication Data

US 2017/0364461 A1    Dec. 21, 2017

(30) Foreign Application Priority Data

Jun. 20, 2016   (GB) .................................. 1610699.9

(51) Int. Cl.
*G06F 13/16*     (2006.01)
*G06F 13/00*     (2006.01)

(52) U.S. Cl.
CPC .......... *G06F 13/1673* (2013.01); *Y02D 10/14* (2018.01)

(58) Field of Classification Search
CPC ............................ G06F 13/1673; Y02D 10/14
USPC ......................................................... 710/110
See application file for complete search history.

(56) References Cited

U.S. PATENT DOCUMENTS

| 5,544,326 | A | * | 8/1996 | Pease | G06F 5/12 |
| | | | | | 710/310 |
| 5,649,231 | A | | 7/1997 | Kitano | |
| 5,687,392 | A | * | 11/1997 | Radko | G06F 13/28 |
| | | | | | 710/22 |
| 5,706,281 | A | * | 1/1998 | Hashimoto | H04L 12/6418 |
| | | | | | 370/252 |
| 6,324,599 | B1 | * | 11/2001 | Zhou | G06F 13/28 |
| | | | | | 710/22 |
| 7,181,588 | B2 | * | 2/2007 | Johnson | G06F 12/08 |
| | | | | | 711/153 |
| 7,724,669 | B2 | * | 5/2010 | Swenson | G06F 13/423 |
| | | | | | 370/229 |

(Continued)

FOREIGN PATENT DOCUMENTS

EP    0 454 605    10/1991

OTHER PUBLICATIONS

Combined Search and Examination Report for GB1610699.9 dated Nov. 25, 2016, 7 pages.

*Primary Examiner* — Christopher B Shin
(74) *Attorney, Agent, or Firm* — Nixon & Vanderhye P.C.

(57) ABSTRACT

A master device has a buffer for storing data transferred from, or to be transferred to, a memory system. Control circuitry issues from time to time a group of one or more transactions to request transfer of a block of data between the memory system and the buffer. Hardware or software mechanism can be provided to detect at least one memory load parameter indicating how heavily loaded the memory system is, and a group size of the block of data transferred per group can be varied based on the memory load parameter. By adapting the size of the block of data transferred per group based on memory system load, a better balance between energy efficiency and quality of service can be achieved.

27 Claims, 9 Drawing Sheets

(56) References Cited

U.S. PATENT DOCUMENTS

| | | | | |
|---|---|---|---|---|
| 7,743,275 | B1* | 6/2010 | Tormasov | G06F 11/1076 |
| | | | | 714/6.12 |
| 8,850,133 | B1* | 9/2014 | Mandic | G06F 3/0668 |
| | | | | 711/154 |
| 9,552,681 | B2* | 1/2017 | Burger | G07C 5/02 |
| 2004/0236924 | A1* | 11/2004 | Johnson | G06F 12/08 |
| | | | | 711/173 |
| 2008/0016265 | A1* | 1/2008 | Oshikiri | G06F 13/4022 |
| | | | | 710/309 |
| 2015/0326481 | A1* | 11/2015 | Rector | H04L 47/14 |
| | | | | 370/236 |
| 2019/0081900 | A1* | 3/2019 | Peleska | H04L 47/22 |

\* cited by examiner

US 10,509,743 B2

TRANSFERRING DATA BETWEEN MEMORY SYSTEM AND BUFFER OF A MASTER DEVICE

This application claims priority to GB Patent Application No. 1610699.9 filed Jun. 20, 2016, the entire contents of which are hereby incorporated by reference.

BACKGROUND

Technical Field

The present technique relates to the field of data processing.

Technical Background

A data processing apparatus may have a master device which can request data from a memory system, and/or write data to the memory system. Some types of master device have a read buffer for temporarily storing data fetched from the memory system while awaiting processing, or a write buffer for temporarily storing data to be written to the memory system.

SUMMARY

At least some examples provide a master device comprising:
a buffer to store data transferred from a memory system or data to be transferred to the memory system; and
control circuitry to issue from time to time a group of one or more transactions to request transfer of a block of data between the memory system and the buffer;
wherein the control circuitry is configured to detect at least one memory load parameter indicative of how heavily loaded the memory system is, and to vary a group size of the block of data transferred per group in dependence on said at least one memory load parameter.

At least some examples provide an apparatus comprising the master device described above and said memory system.

At least some examples provide a method for controlling a master device comprising a buffer for storing data transferred from a memory system or data to be transferred to the memory system, for which data is transferred between the buffer and the memory system in groups of one or more transactions, the method comprising:
detecting at least one memory load parameter indicative of how heavily loaded the memory system is; and
varying a group size of a block of data transferred per group in dependence on said at least one memory load parameter.

At least some examples provide a computer program for controlling a data processing apparatus to perform the method discussed above. A recording medium may be provided to store in the computer program. The recording medium may be a non-transitory recording medium.

Further aspects, features and advantages of the present technique will be apparent from the following description of examples, which is to be read in conjunction with the accompanying drawings.

DESCRIPTION OF EXAMPLES

Some specific examples will be discussed below. It will be appreciated that the invention is not limited to these particular examples.

A master device may have a buffer for temporarily storing data transferred from a memory system or data to be transferred to the memory system. Some masters may have a real time requirement (e.g. a display processor may need to receive a sufficient flow of data from memory in order to continue displaying frames of image data at the required frame rate on a display device, or a direct memory access (DMA) controller may need to write data out from the buffer to memory fast enough to ensure enough buffer space for accommodating further data being supplied to the DMA controller from a source device, otherwise there could be loss of information). Therefore, a master device may periodically need to transfer data between the memory system and the buffer.

From time to time, control circuitry may issue a group of one or more transactions to request transfer of a block of data between the memory system and the buffer. As shall be discussed in more detail below, with the present technique at least one memory load parameter is detected which is indicative of how heavily loaded the memory system is, and a group size of the block of data transferred per group of transactions is varied in dependence on the at least one memory load parameter. Compared to alternative approaches which use a fixed group size or a statically determined group size set by software in advance, by adapting the group size to the current memory load conditions the memory system can be operated more efficiently (e.g. to save power or reduce impact of the master's own requests on other masters competing for access) and the risk of underflow or overflow of the buffer at the master device can be reduced.

Figure 1:
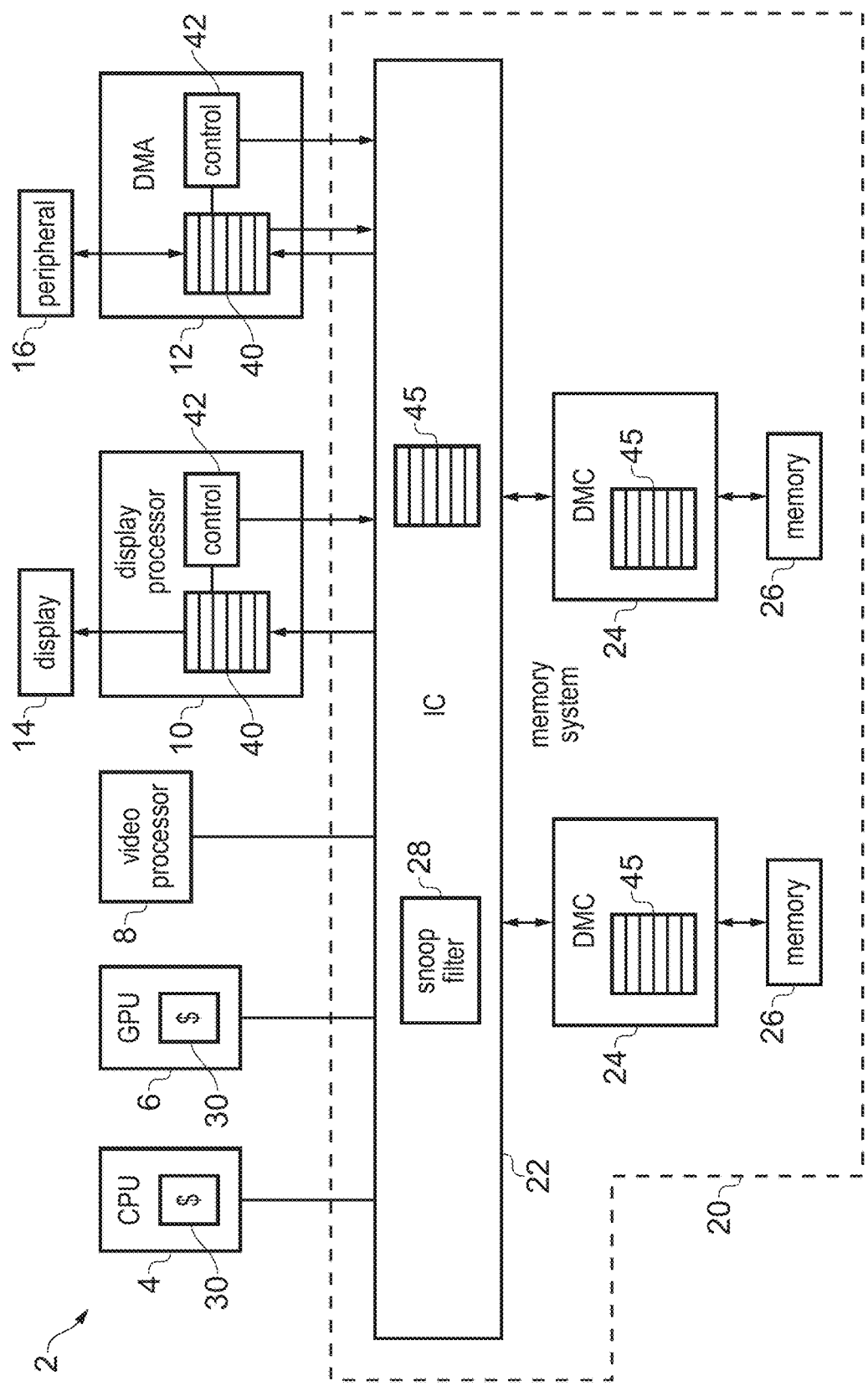
FIG. 1 schematically illustrates an example of a data processing apparatus comprising at least one master device with a buffer for temporarily storing data transferred from a memory system or data to be transferred to the memory system.

FIG. 1 schematically illustrates an example of a data processing apparatus 2 comprising a number of master devices 4, 6, 8, 10, 12 which are coupled to a memory system 20 for storing data. In this example the master devices include a CPU 4 for general purpose processing, a GPU 6 for graphics processing, a video processor 8 for video processing, a display processor 10 for controlling display of images on a display device 14, and a direct memory access (DMA) controller 12 for controlling data transfers directly between memories 26 and/or peripheral devices 16 (bypassing the CPU 4 or GPU 6 for example). The DMA controller may control peripheral-to-memory, memory-to-peripheral, memory-to-memory or peripheral-to-peripheral transfers for example. While FIG. 1 shows an example with a single peripheral device 16, other implementations may have multiple peripherals and the DMA controller may transfer data between the peripherals.

The master devices can issue memory transactions to the memory system 20. The transactions may include load transactions (also known as read transactions) to fetch data from the memory system and store transactions (also known as write transactions) to write data to the memory system. An interconnect 22 couples the master devices 4-12 to each other and to memory controllers 24 within the memory system. Each memory controller 24 acts as a slave device and controls the servicing of transactions by a corresponding memory 26. The different memories 26 can be of the same type or different types (examples of different types of memory may include SRAM, DRAM, Flash, ROM etc.). It will be appreciated that two distinct memories in the example of FIG. 1 is just one example, and that other implementations may have more or fewer memory devices. The interconnect 22 can be considered part of the memory system 20.

Some of the master devices, such as the CPU 4 and GPU 6 may have local cache memories 30 for local storage of data fetched from the memory. Linefills into the cache 30 and evictions from the cache may be controlled according to any known cache management technique (e.g. evictions may be controlled according to a least recently used policy). The interconnect 22 is responsible for maintaining coherency between the local versions of data from the same address which may be cached in the caches 30 of different masters 4, 6. For example, the interconnect 22 may use a snoop-based protocol to maintain coherency, in which when one master 4 requests access to data, snoop requests are sent to other masters 6 which could have cached copies of the data to determine whether that data is cached and in what state (clean, dirty, shared, etc.) and then the cached masters may implement a coherency protocol which ensures that shared data is evicted from local caches or marked as invalid when data having a corresponding address is updated elsewhere. Alternatively, the interconnect 22 may use a directory-based approach where a snoop filter 28 within the interconnect records (at least partially) the caches 30 and the masters which have cached valid copies of data from a particular address, so that at least some snoop requests can be omitted if it is known based on the snoop filter 28 that data is not in a particular master's cache. In some cases a snoop filter 28 may provide a complete record of which data is cached where, in which case no snoops may be required. However, in many cases the snoop filter 28 may provide only a partial record, in which case some snoops may still be required. Any known coherency scheme can be used by the interconnect 22.

Other masters, such as the display processor 10 or the DMA controller 12 may not have a local cache for ongoing storage of data, and instead the masters 10, 12 may perform their functionality (e.g. display or DMA transfers) using data streamed from the memory system 20. For example, each frame to be displayed by the display processor 10 may need to be fetched from memory, as the display processor 10 does not continue to store a previously displayed frame after it has been displayed (the likelihood of identical frames being displayed twice can be low). Hence, the display processor 10 may sequentially fetch in frames of image data to be displayed on the display device 14 and successively display each frame as it is received. Similarly, the DMA controller may request each item of data from a memory 26 that is to be transferred to another memory 26 or peripheral 16.

Such uncached masters can consume a significant amount of bandwidth in the memory system 20. For example, when the display processor 10 is fetching two 4K frames (31.6 MB) at 60 frames per second from the memory system 20, this may consume 3.8 GB/s (2×3840×2160×4×60). To ensure that the frame does not underrun, the display processor may be provided with a buffer 40 (known as a latency buffer or latency FIFO) for temporary storage of data fetched from memory while it awaits processing (display on the display device 14). Similarly, the DMA controller 12 may have a latency buffer 40. The latency buffer 40 provides some tolerance for when the memory system 20 is slow at responding to the transactions issued to fetch the data, so that the data in the buffer 40 can continue to be displayed in "real time" at the required frame rate by the display processor 10, or forwarded to the peripheral 16 or memory 26 by the DMA controller 12. The sizing of the latency buffer 40 can be pessimistic to reduce the chance of underrun, so will be larger than is absolutely required in most scenarios.

Note that while the display processor 10 is described herein for conciseness as controlling the display device 14 to display the data that has been fetched into the buffer 40, this does not exclude the possibility of some additional processing of the image data being performed between reading data out of the buffer and passing data to the display 14. For example, the data read from the memory system 20 may comprise multiple layers of graphics which are to be combined into a single frame to be displayed (e.g. by alpha blending or compositing). This can be useful for example for combining icons or other graphics with an underlying image to form the overall frame to be displayed.

When the display processor 10 is instructed to display data, the display processor 10 may initially issue memory transactions to the memory system 20 to request that the buffer 40 is filled with an initial batch of data to be displayed. Once the buffer 40 is full the display processor 10 may start transferring lines of pixel data to the display 14 to be displayed, and as this data is read out of the buffer 40 this makes more space available for other data to be fetched. The display processor 10 may have a control register which can be programmed by software executing on the CPU 4 to specify a given transaction size to be used for the memory transactions issued to fetch data into the display buffer 40. In typical systems, the transaction size would be set statically in advance, rather than varying during the display of a series of frames. The transaction size would typically be selected to provide a balance between quality of service among the different masters and energy efficiency of accessing memory. For example, the transaction size may be chosen to match the physical structure of the memory devices 26 since typically the memory may be able to access data from a single line of its memory structure more efficiently than smaller accesses. For example, for DDR4-SDRAM a size of 128 bytes or greater is typically used. In general, the memory 26 may be able to handle a larger transaction size more efficiently than a smaller transaction size since accessing a sequential block of memory in one transaction may be more efficient than a number of separate smaller accesses. However, larger transaction sizes may cause quality of service issues for other masters (as this may allow a particular master to monopolise memory bandwidth for a longer time). Therefore, the transaction size selected for the display processor typically balances these factors.

Figure 2:
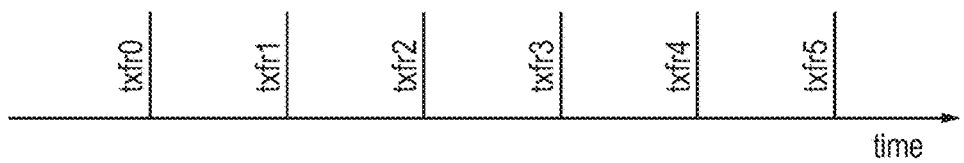
FIG. 2 illustrates an example of periodically issuing memory transactions requesting transfer of a fixed amount of data.

As a layer of frame is read out of the latency buffer 40 and displayed, the buffer starts to drain and a new memory transaction is generated as soon as there is space for another block of data of the specified transaction size. Therefore, as shown in FIG. 2 the display processor 10 will typically generate a periodic series of memory transactions which are relatively evenly distributed in time. In practice, the drain rate of the latency buffer 40 may depend on various factors such as the format of the layer or frame being displayed, the layout of the final image, the output resolution and so on, but in general the transactions may generated at approximately regular intervals. By keeping the buffer 40 topped up as much as possible, this reduces the risk of the buffer under-running (when the next data required to be processed has not yet been fetched into the buffer 40).

However, the inventors recognised that using a fixed transaction size or a fixed threshold occupancy for issuing new transactions to the memory, which leads to a regular period of transactions being issued, may not lead to the most efficient use of the memory system. The respective blocks of the memory system 20 (including the interconnect 22, memory controllers 24 and memories 26) may all consume more power when there are active transactions than when there are no transactions to be serviced. When there are no transactions to be serviced, these blocks 22, 24, 26 can be placed in a power saving state, e.g. by clock gating or clock frequency reduction. For SDRAM for example, there are different power down states that can be used: active power down, where an active row is placed in a low power state, and pre-charge power down where all rows are pre-charged. In both cases, a clock enable signal is taken low and so refresh operations cannot be performed and so the device cannot remain in power down mode longer than the refresh period. In addition, the clock frequency can be reduced. Hence, there are a range of power saving states available.

Opening rows of SDRAM (active commands) and then issuing commands consumes a significant amount of power and so once a row is open, it is more efficient to perform several data accesses before the row is closed again. To exploit this, the memory controllers 24 may be able to merge smaller transactions into larger transactions or reorder transactions in order to increase the likelihood that a number of accesses can be performed to the same row in the memory 26 before the row is closed. Since transactions for the display processor 10 or DMA controller 12 are typically linear (they step through a sequential series of addresses rather than randomly accessing addresses from discrete locations which is more common for cached masters 4, 6), grouping of transactions into longer blocks can be particularly useful for the display processor 10 or DMA controller 12.

Figure 3:
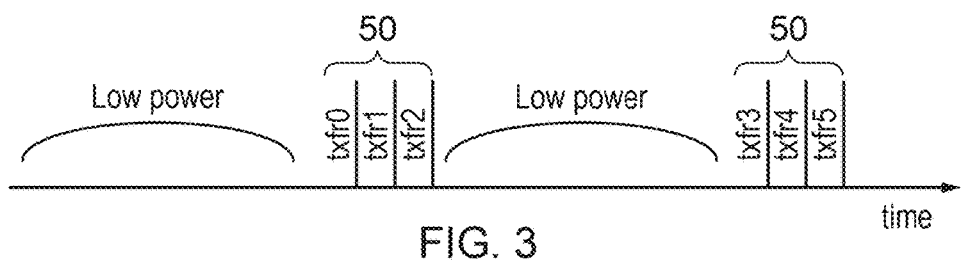
FIG. 3 illustrates an example of grouping transactions together to allow the memory system to enter a power saving state for longer.

Hence, if the display processor 10 regularly generates new memory transactions each time there is space for another block of data in the buffer 40, when the memory system is relatively inactive these periodic memory accesses may prevent the memory system entering its low power state. Therefore, when the memory system is relatively quiescent, larger blocks of transactions would be more efficient. For example, as shown in FIG. 3, if several transactions can be grouped together, then this may leave a longer period in between respective transaction groups during which time the blocks within the memory system can enter their power saving states, to save energy. Grouping transactions means that the latency buffer 40 and the display processor 10 will typically drop to a lower occupancy before data is fetched again. Therefore, there may be less tolerance for delays at the memory system. However, as the memory system is relatively lightly loaded anyway, this is not a significant problem and so overall a larger transaction size may be more efficient. Effectively, the spare margin in buffer occupancy at the masters is exploited to allow more efficient use of memory.

On the other hand, if the memory system is heavily loaded then buffers 45 for queuing outstanding transactions within the interconnect 20 or memory controller 24 may be relatively full and so slots in the buffers 45 may not become available for the display processor 10 or DMA controller 12 very often. In this case, when the display processor 10 or DMA controller 12 does win a slot within the interconnect or memory controller buffers 45, it can be more efficient if the transaction granted access can request as much data as possible to make maximum use of the rare resource in the buffers 45. Hence, in a heavily loaded memory system larger groups of transactions may also be more effective as fewer slots within the interconnect or memory controller buffers 45 are required for requesting a given amount of data from the memory system 20.

In between these extremes, when the memory system load is medium a larger transaction group size may be less preferred, since this may cause the display processor 10 or DMA controller 12 to take too much bandwidth, which may affect the performance of other masters 4, 6, 8, 12 requiring access to memory.

Hence, the inventors recognised that to balance quality of service and energy efficiency, it can be useful to allow the transaction group size used by the display processor 10 or other types of master devices with a local buffer 40 to be varied in dependence on one or more parameters which are indicative of how heavily loaded the memory system 20 is.

Therefore, in general a master device having a latency buffer 40 may have control circuitry 42 for controlling the issuing of transactions to the memory system 20 to request that data is loaded into the buffer 40. The control circuitry may from time to time issue a group of one or more transactions to request fetching of a block of data from the memory system into the buffer. Each transaction may request that a burst of bytes of data is fetched. The number of bytes requested in the burst corresponding to one transaction may be a variable number specified in the transaction or could be fixed. The group issued at a given time may comprise a single transaction or could comprise several transactions back to back. Hence, the term transaction is used to refer to a single request for one or more bytes of data, which may be handled using a single slot in the buffers 45 within the interconnect or the memory controllers. On the other hand the term group is used to refer to one or more transactions back to back which are issued by the master device. The term "group size" refers to the size of the overall block of data which is requested among all the transactions within the same group. Hence, if the group only comprises one transaction then the group size is simply equal to the burst size of that one transaction, while if the group contains multiple transactions then the group size is the total size of the respective bursts of data requested by each transaction in the group.

Hence, there are different ways in which the display processor 10 can vary the group size for a particular group of transactions. Either the size of the portion of data requested per transaction in the group can be varied, or the total number of transactions in the group can be varied, or a mixture of the two. In some cases, the group need not necessarily have all the transactions having the same burst size, for example it may be possible to have one transaction in the group request a larger burst of data than the other. However, in many cases each of the transactions in the same group may use the same burst size. Hence, in the example of FIG. 3 for example each group 50 comprises three transactions back to back and each transaction may request a certain burst of data, e.g. 8 or 16 bytes.

There are a number of ways in which the current memory load conditions of the memory system can be detected by the master device 10, 12. In general the master device may detect any memory load parameter which is indicative of how heavily the load memory system is. For example, the control circuitry 42 could track the response time (the time between issuing a transaction to the memory system and receiving a response to the transaction) over a number of transactions. The memory load parameter can comprise the absolute time measured for each transaction, or a maximum time or average time detected over a number of transactions. The transaction group size can then be set based on this memory load parameter.

In another example the memory system itself may detect a parameter indicating its current load. For example a block within the memory system (e.g. the memory controller 24) may monitor the occupancy of its internal buffers 45, latency in handling transactions (e.g. absolute, maximum or average length of time for which transactions remain pending in buffers) or a number of quality of service escalations (instances when some response action is required because one or more transactions have not been handled in sufficient time). A signal determined based on one or more of these factors can then be sent back to master devices 10, 12 indicating whether the detected load level. The signal could indicate a quantitative measure of load (e.g. buffer occupancy) or could simply be a qualitative indication of one of a number of classes of load conditions (e.g. low, medium or high). Some memory protocols may allow the memory system 20 to provide status data alongside responses to transactions, in which case this status data could be used to signal the memory load parameter. However, in this case signalling of the load conditions may take place only when there is a transaction to respond to, and so in times of low memory load this may reduce the frequency with which the master device 10, 12 can be updated with the memory load information. To allow more frequent signalling of memory load conditions, for memory protocols which do not support signalling of additional information other than alongside transaction responses, a separate side-channel path, distinct from the standard memory protocols, could be provided to communicate the memory load information.

The master device 10, 12 can also monitor the memory system load itself based on the occupancy of its own latency buffer 40. This avoids the need for a signalling mechanism to allow the memory system to communicate the load information. For example, the memory load parameter may be dependent on the minimum buffer occupancy reached in a predetermined period. The period could be a certain length of time, or correspond to processing of a certain unit of data (e.g. a group of lines of pixels, a layer or frame of display data, or a group of multiple layers or frames). In general, if memory system load is high then the buffer occupancy in the buffer 40 will drop lower by the time a frame is complete than if the memory system load is lighter. Hence, the minimum occupancy of a buffer reached in each period can be tracked for a number of periods, and by comparing the minimum occupancies reached in different periods, changes in memory load can be detected.

Figure 4:
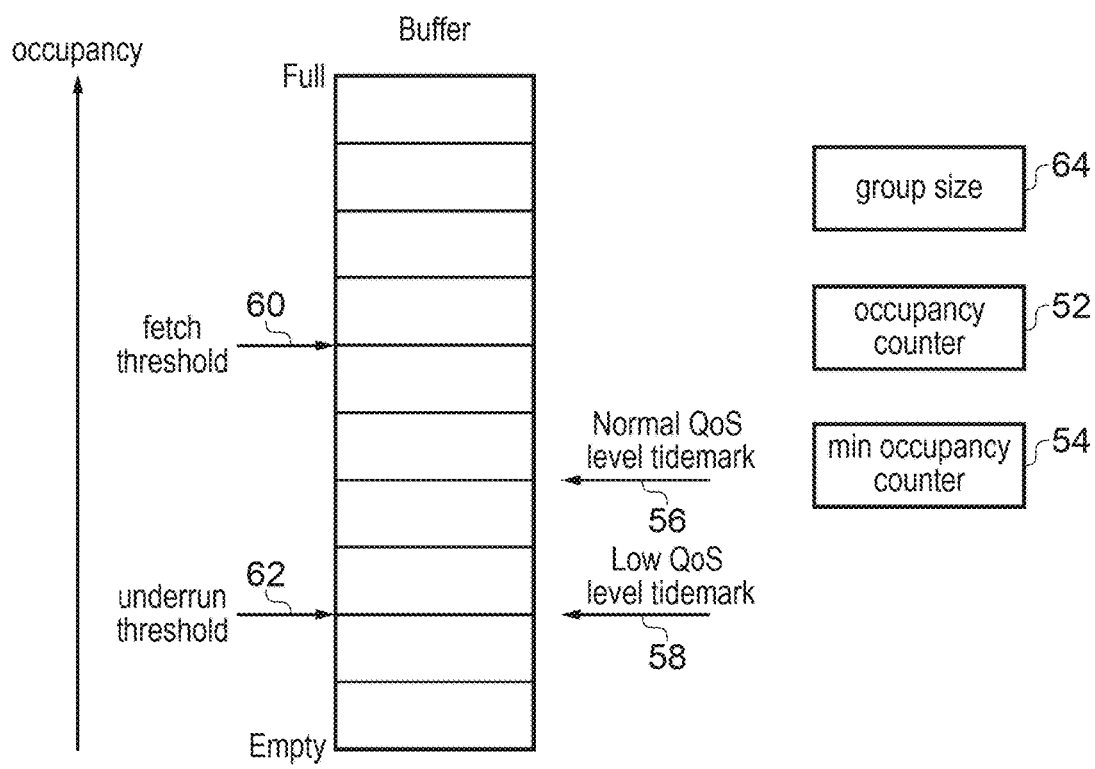
FIG. 4 shows an example of tracking buffer occupancy of the buffer.

FIG. 4 schematically illustrates an example of tracking the occupancy of the buffer 40. A counter 52 may be recorded to track the buffer occupancy, which may be incremented each time more data is allocated to the buffer, and decremented when data is read out from the buffer. A further counter 54 may be provided to track the minimum occupancy level 68 reached during a given period as discussed above.

Software or hardware may compare the current occupancy counter with one or more thresholds or "tidemarks". In this example a "normal" QoS (quality of service) level tidemark 56 and a "low" QoS level tidemark 58 are shown. These may be used to control the priority of transactions issued to memory. For example, transactions issued when buffer occupancy is above the normal tidemark 56 may be issued with low priority, transactions issued when buffer occupancy is between the tidemarks 56, 58 may be issued with medium priority, and transactions issued when buffer occupancy is below the low tidemark 58 may be issued with high priority to try to reduce the risk of underrun. Other systems may only provide one tidemark which divides low and high priority transactions for example.

In addition, a fetch threshold 60 and underrun threshold 62 may be defined (although in some cases the fetch threshold 60 and underrun threshold 62 may be the same as the normal and low tidemarks 56, 58 respectively). When the buffer occupancy reaches the fetch threshold 60, a new group of transactions is issued to request more data from memory. A control register 64, which can be programmable by software, may also be provided to control the transaction group size used for groups of transactions. When the buffer occupancy reaches the underrun threshold 62, an underrun handling response is taken (see FIG. 12 discussed below). Note that the occupancy dropping below the underrun threshold does not indicate that underrun has already occurred, but that there is a risk of the underrun happening in the near future.

Figure 5A:
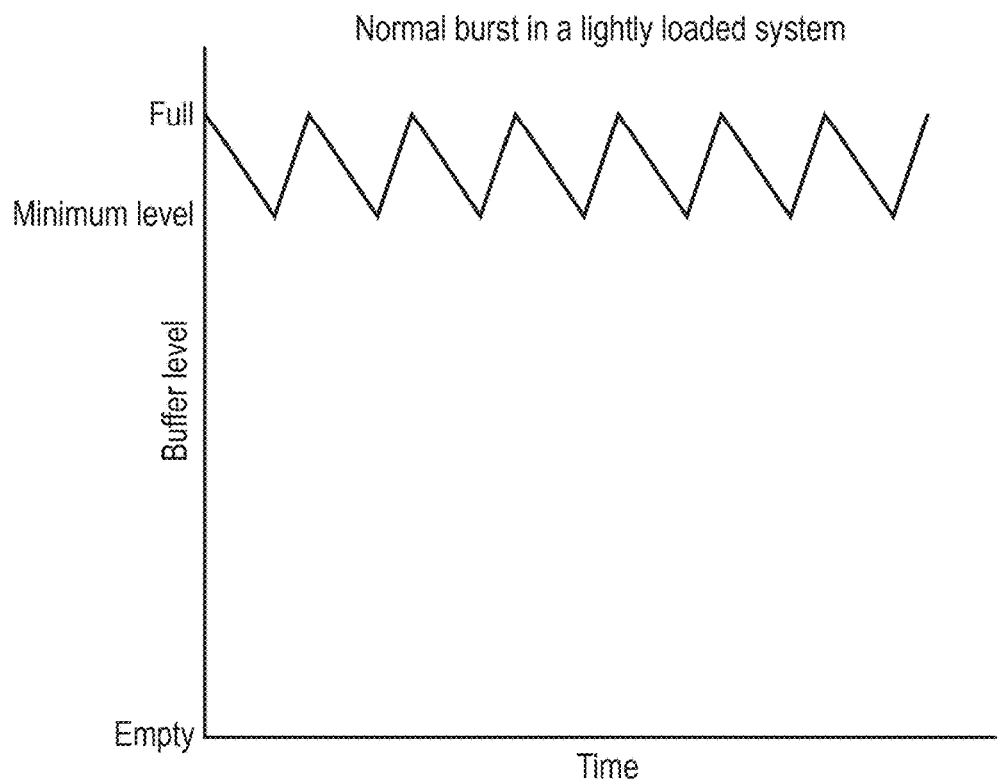
FIGS. 5A and 5B compare variation in buffer occupancy over time for examples with smaller and larger transaction sizes.
Figure 5B:
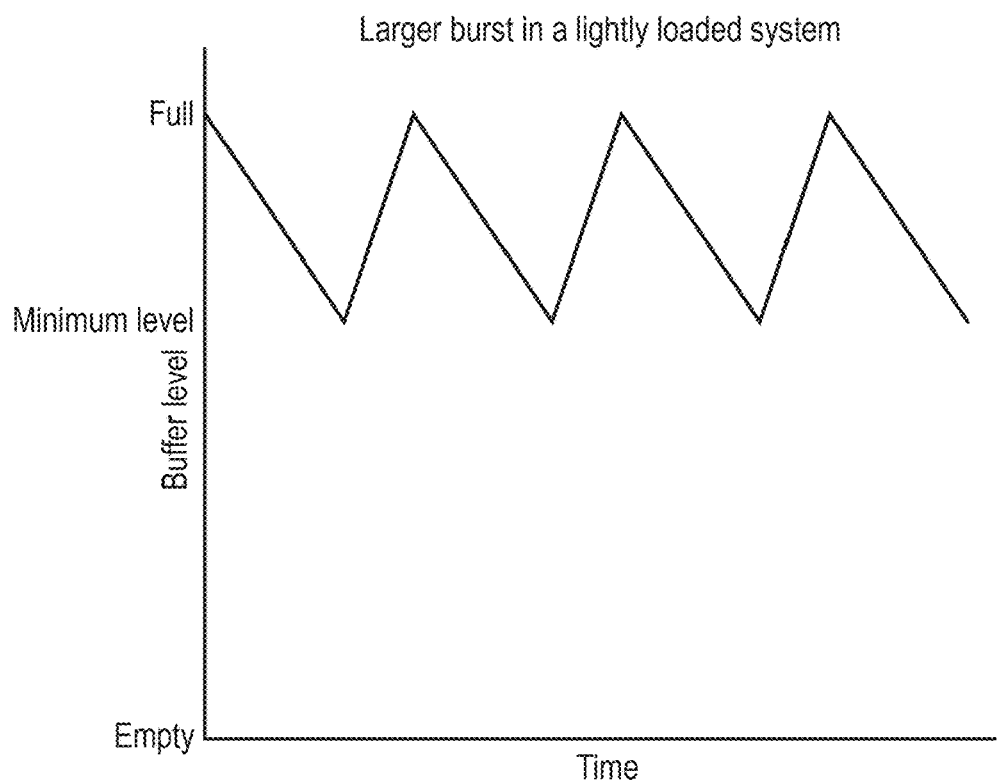

FIGS. 5A and 5B compare buffer variation over time for two examples where the transaction group size is varied by changing the size of the burst of data requested per transaction. In FIG. 5A, the burst size is smaller than in FIG. 5B, and also the fetch threshold level 60 is higher than in FIG. 5B. Hence, in FIG. 5B the buffer occupancy drops to a lower level before the buffer is replenished than in FIG. 5A, and hence the minimum level detected is lower. In both cases, the memory system is relatively lightly loaded and so the data requested is received in good time and the buffer remains relatively full in both instances. Therefore, in this case, selecting the larger transaction group size as shown in FIG. 5B would be preferred as this can allow longer periods of inactivity in the memory system between successive groups of transactions, allowing longer use of the power saving state.

Figure 6A:
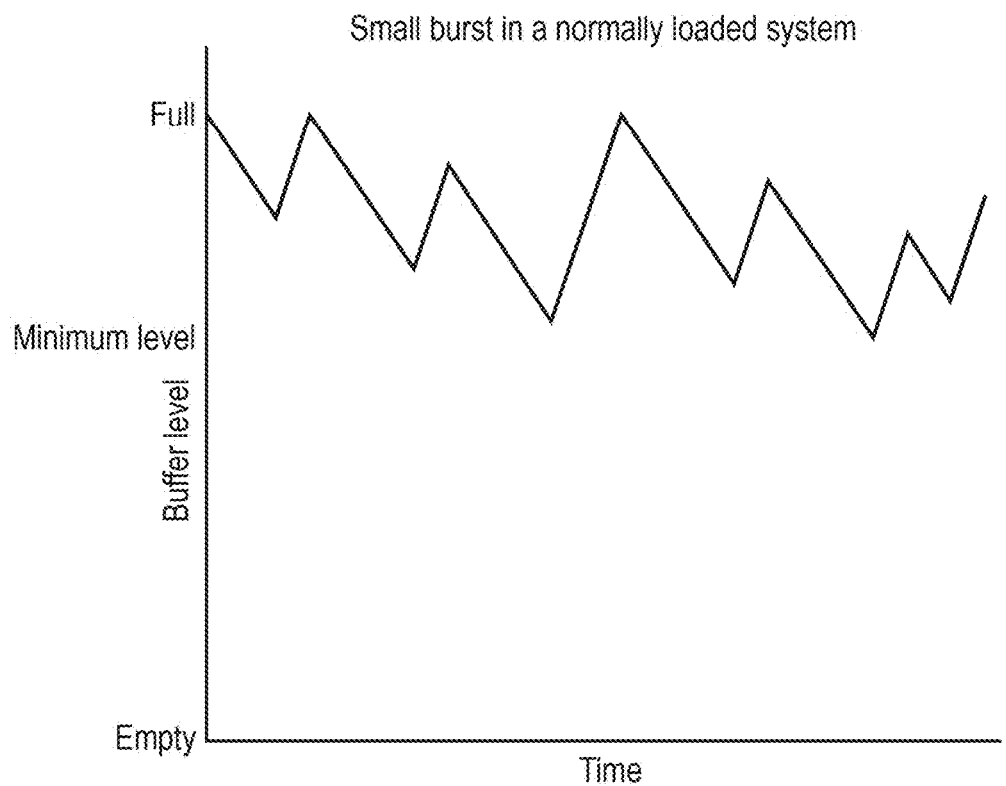
FIGS. 6A and 6B compare variation in buffer occupancy over time for different memory load conditions.
Figure 6B:
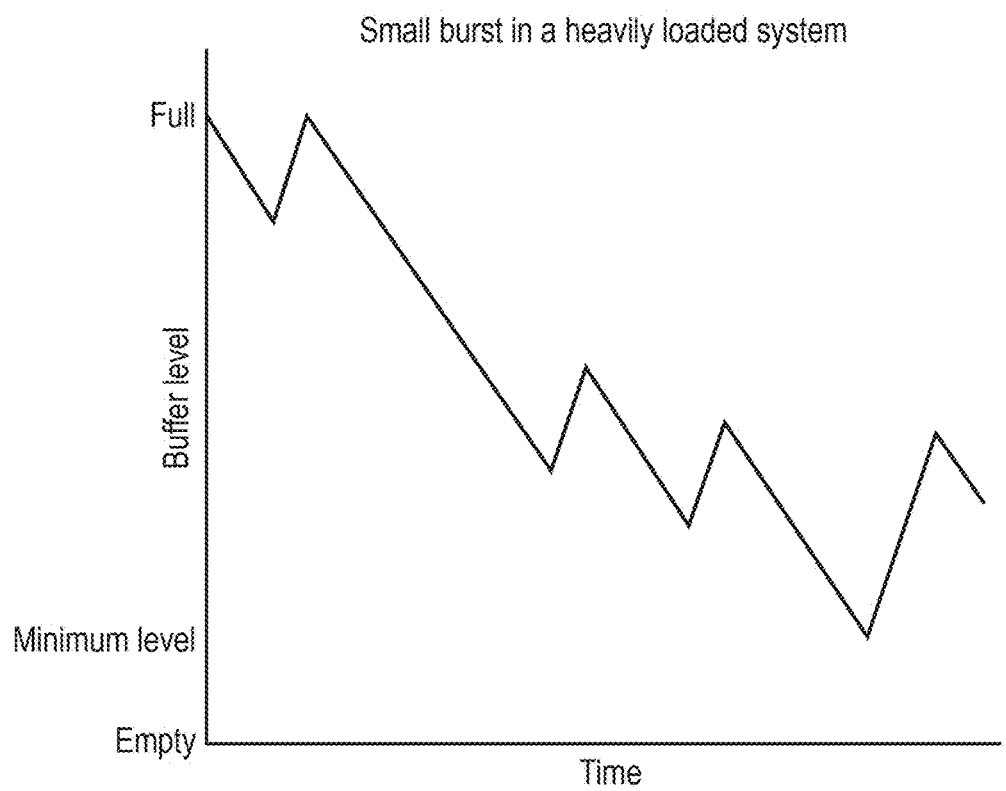

FIGS. 6A and 6B compare buffer variation over time for two examples where the transaction group size and fetch threshold remains the same, but with varying memory load conditions. In FIG. 6B, the memory system is more heavily loaded than in FIG. 6A. Therefore, some transactions experience longer delays in FIG. 6B, so that the buffer occupancy drops lower and the detected minimum level during a given period is lower than in FIG. 6A. The variation in buffer occupancy is more volatile in the heavily loaded example of FIG. 6B than in FIG. 6A, and there is an increased risk of underrun. Hence, this shows that tracking the minimum buffer occupancy using counter 54 can provide a mechanism for detecting memory system load at the master device 10, 12.

Figure 7A:
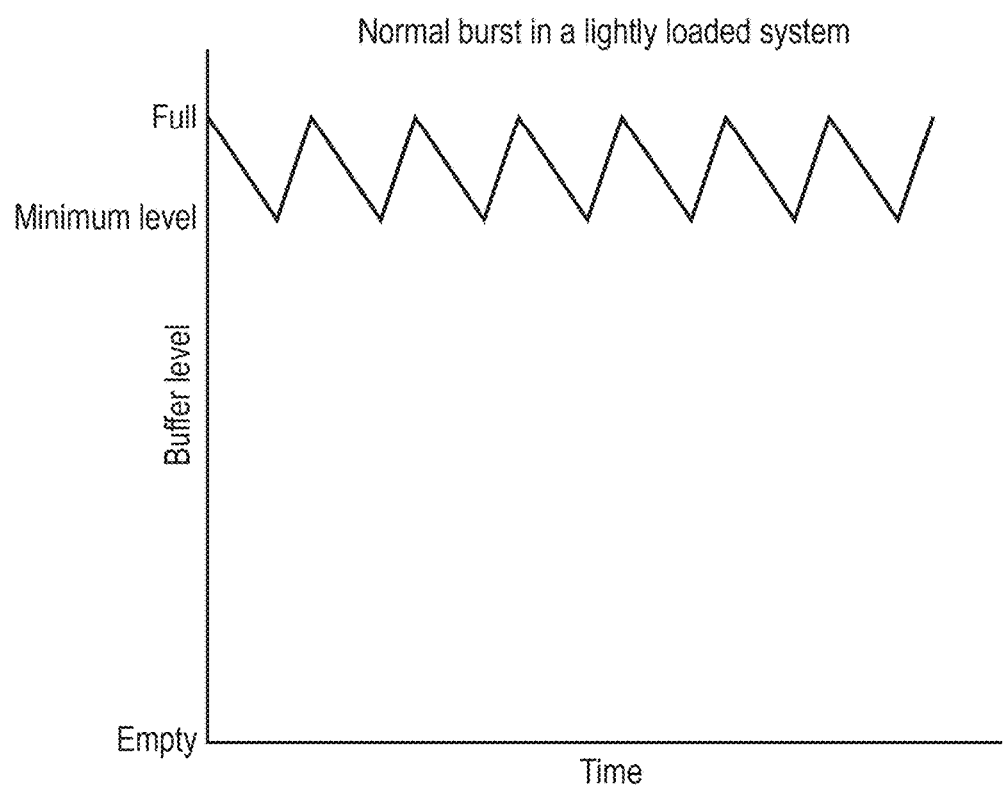
FIGS. 7A and 7B compare variation in buffer occupancy over time for different transaction group sizes.
Figure 7B:
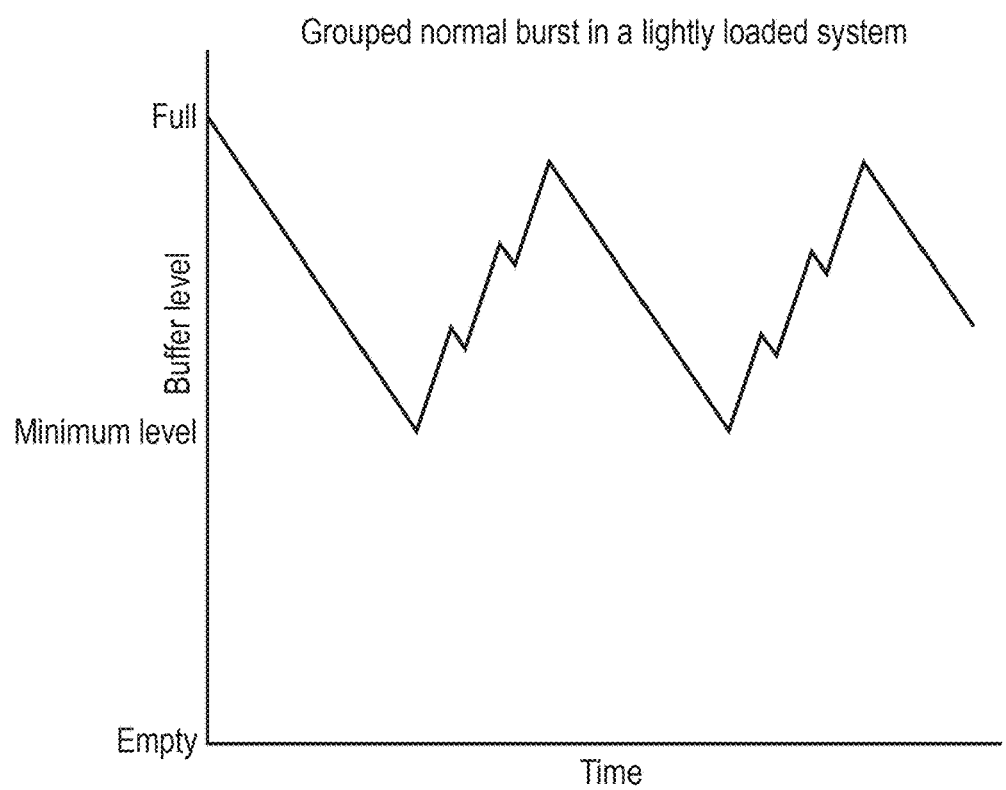

FIGS. 7A and 7B show another way of varying the transaction group size. In this example, rather than changing the size of a burst of data requested by a single transaction, instead three transactions are grouped together in FIG. 7B, compared to individual transactions issued in FIG. 7A. This achieves a similar effect to the one shown in FIGS. 5A and 5B.

Figure 8:
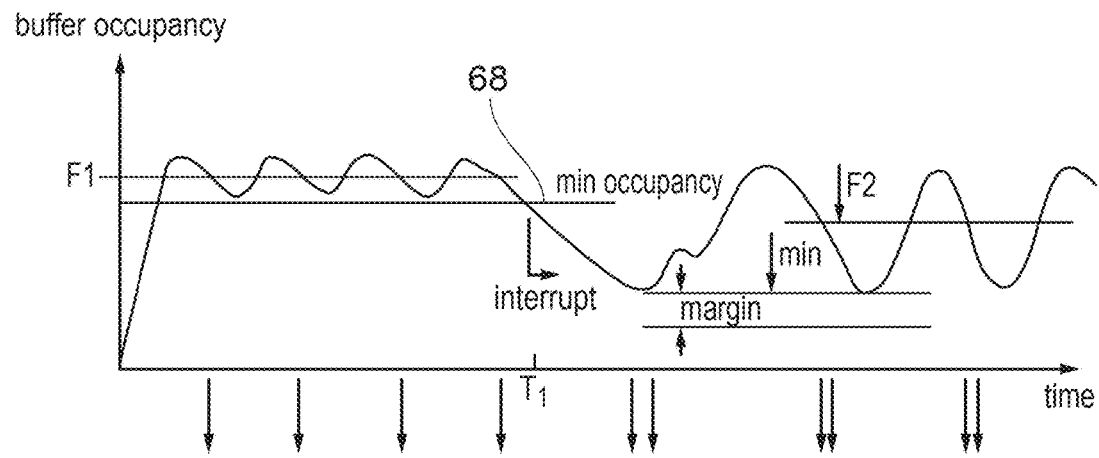
FIG. 8 shows an example of detecting a change in load condition of the memory system based on the buffer occupancy in the master device.

Hence, FIG. 8 shows an example of using the minimum occupancy level 68 to detect a change in the memory system loading, and of changing the transaction group size accordingly. Initially load is low and the buffer occupancy varies in a similar way to FIG. 5A. However, a drop in occupancy below the previous minimum is then detected, which indicates that memory system load has increased. The control circuitry 42 or software can detect this drop and update the transaction group size 64 and/or fetch threshold 60 so that subsequent groups of transactions are issued less frequently with a larger group size (either with multiple transactions in a group or with larger bursts of data per transaction), to reduce the change of underrun. The minimum occupancy reached in a given period can continue to be tracked for future frames and if it becomes higher again then this may indicate that memory system load has decreased again, in which case the transaction group size may be reduced again to give more bandwidth to other masters.

Figure 9:
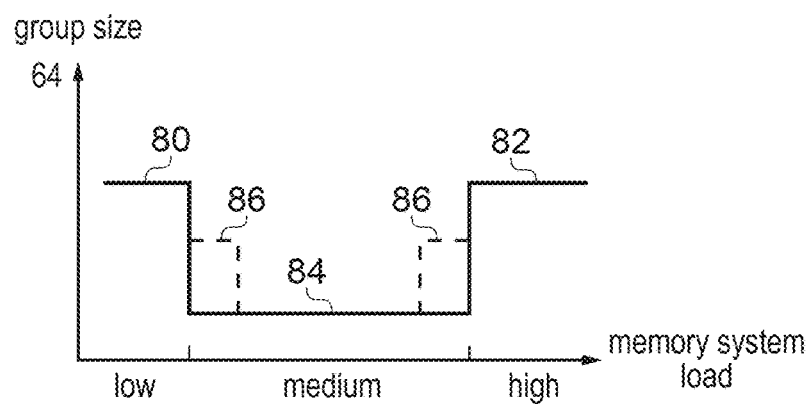
FIG. 9 shows examples of varying a transaction group size or a fetch threshold in dependence on memory system load.
Figure 9:
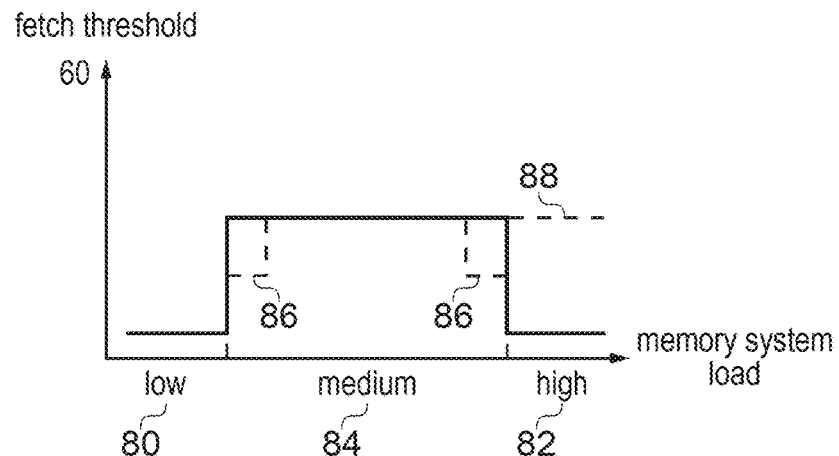

As shown in FIG. 9, the group size and the fetch threshold 60 may be varied depending on memory system load. In one example the group size may be set higher in cases of low or high system load 80, 82 than in cases of medium system load 84. While the example of FIG. 7 shows three distinct regions with different values of the group size, it is also possible to provide a more gradual variation of the group size with memory load (e.g. reducing the group size in steps as the memory system load increases from low to medium and increasing in steps again as it increases from medium to high, as shown by the dotted line 86). The thresholds for distinguishing low/medium/high load (or further classes of load condition) can be chosen arbitrarily by the designer of a particular implementation based on the needs of that system. It is not essential for the group size to be the same in the low and high regions 80, 82. In general, any variation where generally in a case of medium load a smaller group size is used than for cases of lower or higher load can provide a good balance between low power and performance.

As shown in the lower part of FIG. 9, the fetch threshold 60 may be varied in the opposite manner to the group size, being higher in the medium load condition 80 than in the low or high load condition 80, 82. Again, a more graduated profile may be used as indicated by the dotted lines 86. In some cases the group size 64 may be equal to the total buffer size minus the fetch threshold 60 level (i.e. the fetch threshold is varied and then the group size corresponds to the size required to fill up the buffer again from that point). Alternatively, the fetch threshold 60 and group size 64 may be set independently. For example, in some implementations it may be preferred for the fetch threshold to remain high in the high load condition 82 as shown by dotted line 88, to request data more frequently in the case of underrun.

A hardware or software mechanism can be used to vary the transaction group size. In some cases a software configuration approach may be used. In this case various performance counters may be provided in software or hardware which can be read by software executing on the CPU 4 for example. The software may use these to determine the preferred group size (e.g. according to the relationship as shown on FIG. 9) and may program a register 64 in the display processor 10 or DMA controller 12 to indicate the appropriate transaction size. When buffer occupancy drops below the previously detected minimum occupancy then this can trigger an interrupt to trigger the software driver to reprogram the group size.

Alternatively, hardware may be provided which automatically reconfigures the group size and/or fetch threshold 60 based on the detected memory load. This can enable faster response to changing memory system load. Hence, the display processor may have control circuitry 42 which itself checks the minimum occupancy reached (or other memory system load parameters) and uses this to determine the appropriate fetch threshold 60 or group size 64 for subsequent transaction groups.

In both cases a margin may be applied to the minimum occupancy level 68 to determine the level for determining current memory system load. This may account for the buffer occupancy possibly dropping below the current minimum in the near future if memory system load is high or increasing. For example the value used to calculate the group size or fetch threshold may correspond to the detected minimum occupancy minus a margin. The margin can be fixed or can be programmable in software.

Also, in some cases the software driver or the control circuitry 42 may impose certain minimum and maximum values on the fetch threshold 60 and/or group size 64. The minimum and maximum values could be fixed values set in hardware or software or could be programmable by software.

Figure 10:
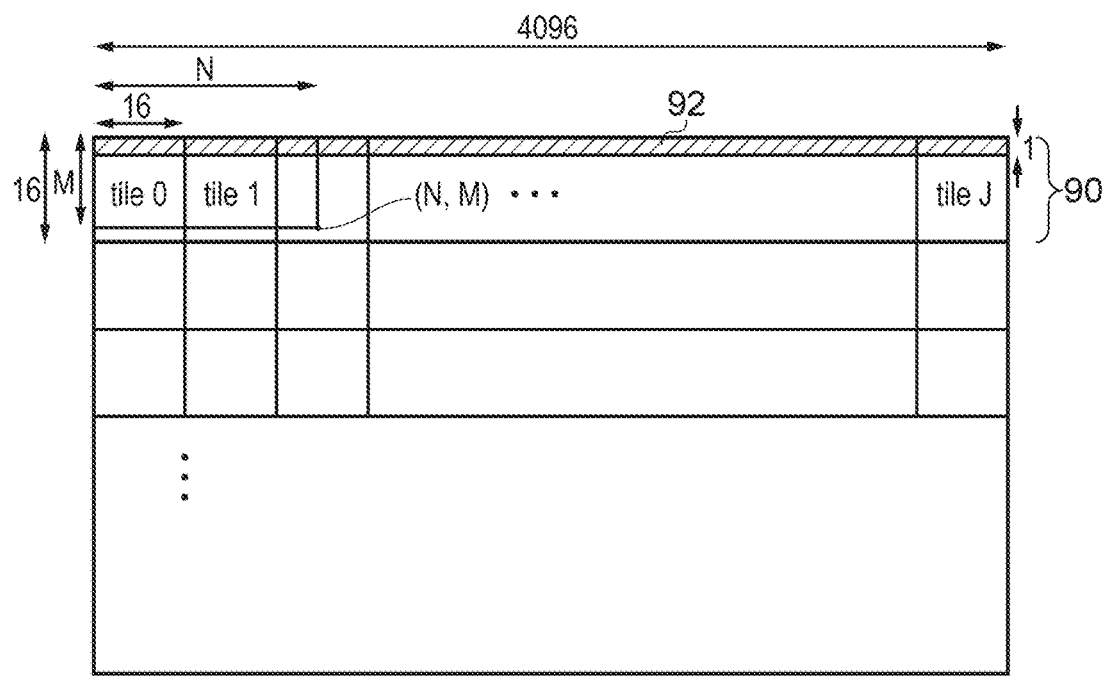
FIG. 10 shows an example of triggering fetches when data associated with a given position within a row of tiles is read out from a buffer in a display processor which performs a detiling operation.

While FIG. 4 shows an example where a fetch threshold occupancy level 60 is defined to control the timing when the next group of one or more transactions is issued to the memory system, in other examples the timing of the next block of transactions could be controlled in terms of the data position (relative to a given data structure being processed, such as a frame or group of lines of pixels) reached in reading data out from the buffer. For example, as shown in FIG. 10 this can be useful in systems which include a detiler to map tiles of display data read from the memory system 20 to lines of data to be passed to the display 14. The GPU 6 may for example generate images to be displayed in small units (called tiles) of a certain size, e.g. 16×16 pixels, which may be written out to the memory system 20 in tiles so that one tile is written to a block of sequential addresses in memory, and then the next tile is written to a following block of sequential addresses and so on. Hence, when the data is streamed out to the display processor 10 it will be in units of tiles.

On the other hand, the display device 14 (e.g. an LCD display or LED display) may typically operate in a raster scan mode in which pixels in one line of pixels are sent for display first, followed by the next line of pixels, then the next and so on. One line of pixels may for example include a certain number (e.g. 4096) of pixels and this may span multiple tiles. Hence, as shown in FIG. 10, when displaying data there may be a need for a detiling operation where one row 90 of tiles (e.g. J tiles, with J=256 in this example) is read out from the memory 26 into the latency buffer 40, and once the entire row of tiles are available, the first line 92 of pixels can be read out for display 14. Hence, with a system supporting detiling the latency buffer 14 may need to be relatively large, because until the entire row of tiles have been loaded onto the buffer 40, no data from that row can be displayed. While there is a delay in the display of the first line of pixels 92 in the row of tiles, the remaining lines of pixels experience much less delay as they are now available to be read soon after the first line.

In this case, there is typically a threshold fetch position [N, M] identifying a particular pixel within a row of tiles for which, when that pixel is read out from the buffer 40 and forwarded for display, transactions for fetching the next row of tiles are initiated to memory. The threshold fetch position [N, M] should be early enough that by the time the display processor 10 has displayed all of the current row of tiles, the next row of tiles is available in the buffer to avoid underrun.

To avoid underrun, the latest possible pixel position for [N, M] can be calculated as follows:

Threshold$_{NoFetches}$=Whole row of tiles written to detiler
(stop issuing transactions when a whole row of tiles has been fetched)
Threshold$_{ResumeFetches}$=Cycles$_{DrainDetiler}$[N,M]≤ (Cycles$_{FillDetiler}$+Margin)
(resume fetching at the latest at the point when the number of cycles to drain the detiler becomes less than the number of cycles to fill the detiler, plus a margin for safety)
Cycles$_{FillDetiler}$ is the number of cycles to fill detiler, and can be calculated as follows:

$$Cycles_{FillDetiler} = \text{Number of Tiles} \times \text{Cycles to decode one block}$$

Margin is a software programmable parameter representing number of cycles that can offset any delay caused by system latency.

Cycles$_{DrainDetiler}$[N,M] is the number to cycles to drain detiler given that location of currently read pixel within a row of tiles is [N,M], (where N refers to the horizontal dimension (along a row of tiles) and M refers to the position along the vertical dimension (along a column).
Cycles$_{DrainDetiler}$[N,M] can be calculated as follows:

$$Cycles_{DrainDetiler}[N, M] = \left[(H \times W) - \left[(N-1) \times W + \frac{M}{P}\right]\right] \times \frac{P}{D}$$

where:
H is the number of pixels in one column of a tile (e.g. H=16 in the example of FIG. 10),
W is the number of memory words in one line of tiles, where a word is the minimum unit of data that can be independently addressed in the memory system (e.g. W=1024 in the example of FIG. 10),
P is the number of pixels represented by one memory word (e.g. P=4 in the example of FIG. 10), and
D is the number of pixels drained from the buffer per cycle (e.g. D=1 in many cases, but other examples may read out multiple pixels per cycle).

Using these equations, N and M can be calculated as follows:

$$Position_{NM} = H + 1 - \frac{D \times (Cycle_{FillDetiler} + \text{Margin})}{W \times P}$$

N=⌊Position$_{NM}$⌋, (where ⌊ ⌋ denotes the floor function)
M=(Position$_{NM}$−N)×P Hence, as soon as the detiler reads out a word of data containing the pixel at location [N,M] within a row of tiles, fetching should be resumed and the next batch of transactions issued to start loading in the next row of tiles.

Nevertheless, there is freedom for the controller 42 and the display processor 10 to start issuing fetch transactions earlier if desired, so the value for [N, M] calculated above is the limit to the fetch threshold position. Whether it is better to initiate fetches earlier with smaller transaction sizes or later with larger transaction sizes may depend on the memory system load and so the threshold fetch position can be varied according to the detector memory load parameters as discussed above.

Hence, in general the fetch threshold could be specified either as an occupancy level 60 as in the example of FIG. 4 or in terms of a relative position within a predetermined structural unit of data (e.g. a frame or line of tiles) to which data has been read out from the buffer.

While various examples of memory load parameters are discussed above, it will be appreciated that several of these could be used in combination.

The above examples concern a read buffer within a master device for buffering data fetched from a memory system 20. However, similar techniques can also be applied to write transactions issued for writing data from a write buffer to the memory system 20.

For example, when the DMA controller 12 is writing data to the memory system 20 that has been received from a source device (e.g. a peripheral 16 or another memory 26), the data received from the source device may be temporarily buffered in a write buffer (which could be the same buffer 40 as the read buffer or a separate buffer from the read buffer) before being written out to the memory system 20. Likewise, in some examples the display processor 10 may have a write buffer (not shown in FIG. 1) for buffering composited or processed output data generated by the display processor 10. Data can then be written to memory (as well as to the display) from the write buffer, to avoid having to repeat the compositing or processing again when the same data is displayed later. If the write buffer is unable to write data out to memory fast enough (compared to the rate at which data is being supplied from the source device to the DMA controller 12 or generated within the display processor 10), then an overrun condition may occur when the write buffer becomes full (or almost full). In some cases this can lead to loss of information (e.g. if data streamed to the DMA controller is lost because there is not enough space in the buffer).

Hence, typically a write transaction to write data out to memory may be generated when there is enough data in the write buffer, and again the transaction size for such a transaction may be specified by software. However, simply issuing transactions each time the buffer occupancy reaches a threshold level would lead to periodic transactions in a similar way to the example shown in FIG. 2 for the read buffer. Hence, to improve memory efficiency the transaction group size (the size of the block of data requested per transaction, and/or the number of transactions grouped together) can be adjusted in dependence on the memory load condition in a similar way to the read example. For example, write transactions can be grouped together to reduce power consumption when the memory load is low, larger transactions can be issued when the memory load is high to reduce the chance of overrun, or the number of outstanding transactions can be changed in cases of heavily loaded memory.

Hence, for a write buffer the technique is similar to that discussed above for the read buffer, except that:
- instead of underrun, an overrun condition is detected when the buffer occupancy rises to or above an overrun threshold;
- the next group of write transactions may be triggered when the buffer occupancy rises to or above a transaction-issuing threshold level (the threshold may be varied in dependence on the detected memory load);
- memory system load can be detected by tracking a maximum buffer occupancy reached during a given period, rather than a minimum occupancy;
- the transaction group size may be dependent on the sum of the maximum buffer occupancy and a margin amount (to provide some tolerance in case there are further increases in buffer occupancy)
- an exception condition may be triggered if the amount of spare capacity in the buffer becomes less than the margin amount (i.e. when the sum of the buffer occupancy and the margin amount exceeds the total size of the buffer).

In some cases, a master device having both a read buffer and a write buffer may group together both read and write transactions in the same transaction group, to reduce power consumption in a lightly loaded memory system. In some cases, read and write transactions may have equal priority. Alternatively, reads may have a higher priority than writes, or vice versa, so if there is limited memory bandwidth available then the control circuitry 42 in the master device 10, 12 can focus memory traffic on the higher priority transactions. For some types of masters, the relative priority of reads and writes could be fixed. For example, for a display processor 10 it may be more important to service reads than writes as if an underrun occurs this may corrupt the image on the display, while in the case of overrun it may be possible to simply reuse previous output data. Alternatively, the relative priority of reads and writes could be varied dynamically depending on the condition of the respective buffers. For example, if underrun is likely in the read buffer, reads could be prioritised, while if overrun is likely in the write buffer, then writes could be prioritised.

Figure 11:
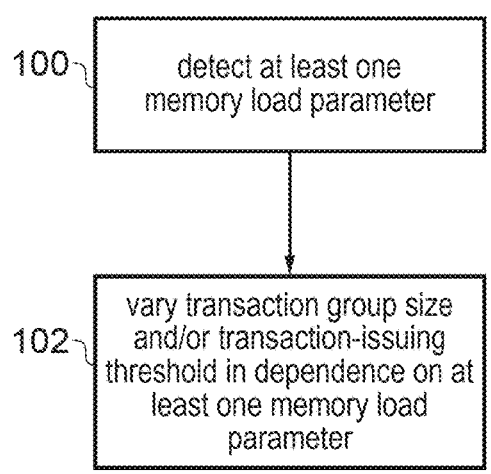
FIG. 11 is a flow diagram illustrating a method of controlling issuing of memory transactions by a master device.

FIG. 11 schematically illustrates a flow diagram illustrating a method of controlling issuing of transactions at a master device 10, 12 having a buffer 40 (which could be a read buffer or a write buffer). At step 100 at least one memory load parameter is detected (e.g. any one or more of the examples described above—buffer occupancy, transaction response time or signal from the memory system). At step 102 the transaction group size and/or the transaction-issuing threshold at which read or write transactions are issued are varied in dependence on the detected memory load parameter.

Figure 12:
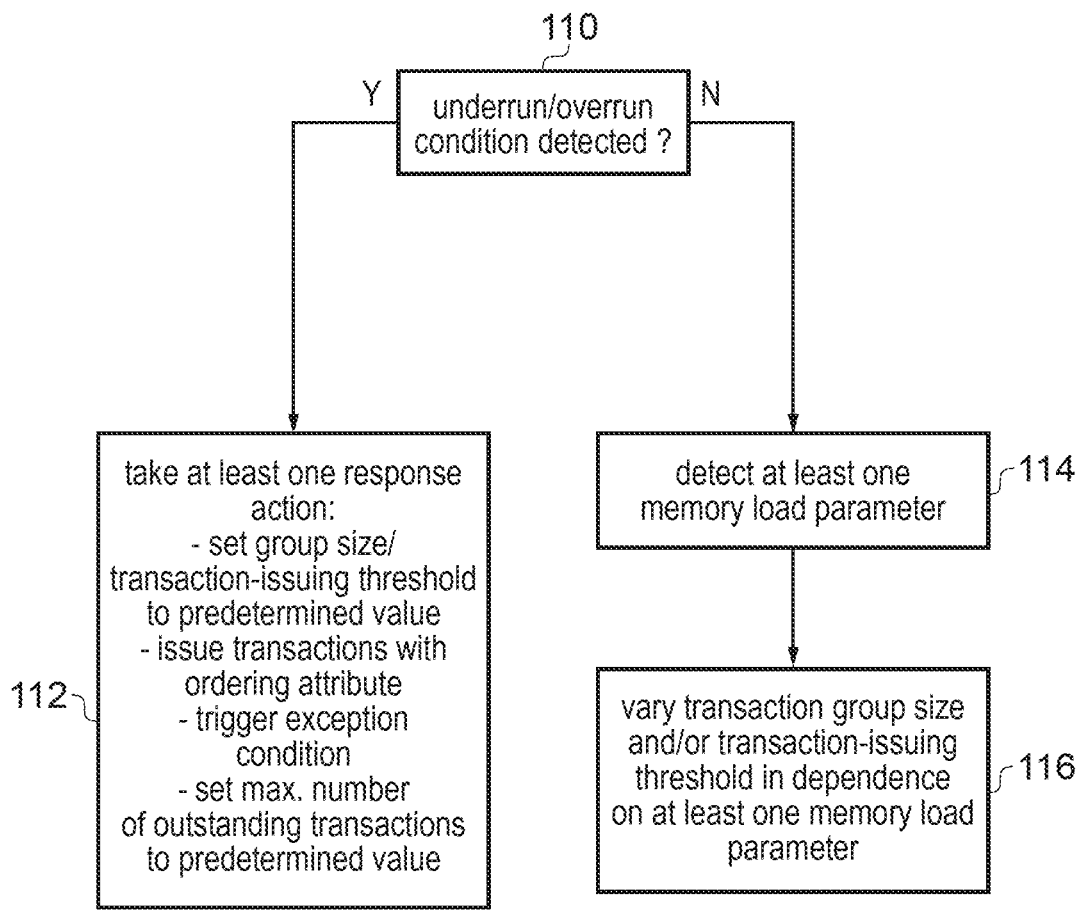
FIG. 12 is a flow diagram illustrating handling of an underrun or overrun condition.

The transaction group size or transaction-issuing threshold occupancy/position need not always be varied based on memory load parameters. As shown in FIG. 12, in cases when there is a risk of underrun or overrun, the memory load dependent setting may be overridden and instead a response action may be taken to reduce the risk of underrun/overrun. At step 110 the master device detects whether there is an underrun or overrun condition (when there is a risk of underrun/overrun in future). For example for a read buffer the underrun condition may be detected when a buffer occupancy of the buffer 40 drops to or below the underrun threshold 62. Alternatively, the underrun condition can be detected if the minimum latency buffer occupancy drops below the margin amount. For a write buffer, the overrun condition may be detected when the buffer occupancy rises to or above an overrun threshold, or if the spare buffer capacity (the difference between the current occupancy and the total buffer size) drops below the margin amount. In response, at step 112 at least one response action may be taken. These may include one or more of the following techniques:

1. The group size and/or the transaction-issuing threshold can be set to a predetermined value. For a read buffer, typically this may be a relatively large group size and a relatively high fetch threshold to ensure that more data is requested per group of transaction and groups of transactions are issued more frequently, to try to fetch in as much data as possible as soon as possible to reduce the risk of underrun in future. For a write buffer, the group size may be set higher to write out data as fast as possible, and/or the write-issuing threshold set lower to ensure that data is written out to memory earlier next time to reduce the risk of overrun in future.

2. Transactions can be issued with an ordering attribute which specifies that the transactions should be serviced by the memory system in the same order that they are issued by the master device. Memory controllers 24 may have freedom to reorder transactions to improve efficiency of accessing memory 26. For example if the CPU 4 is currently accessing a given line of the memory structure 26 and the memory controller detects that one of the transactions issued by the display processor several transactions further on will also access the same line of memory, then that transaction may be handled ahead of an earlier transaction issued by the display processor 10 to make use of the already active line of memory and avoid the penalty of closing a line of memory and then reopening it again some time later. However, when the display processor 10 is close to underrunning its buffer 40 then such reordering can exacerbate the problem since it may not be particularly useful for the display processor 10 to receive data to be displayed later when it is still waiting for earlier data which must be displayed first. In cases when the buffer is not close to underrunning, then such reordering by the memory may be appropriate, but in the underrun condition it may be preferable to disable this reordering. Some memory access protocols allow a master to specify an attribute in the transaction which controls whether or not it can be reordered with respect to other transactions issued by the master. In some cases the reordering parameter may specify that the transaction can or cannot be reordered relative to earlier/later transactions (e.g. using a binary flag). Other protocols may allow different groups of transactions to be assigned particular identifier values, and reordering may be prevented between transactions which share the same identifier value, while transactions with different identifier values can be reordered with respect to each other by the memory system 20. When the underrun condition is detected, subsequently issued transactions may be issued with the same ordering ID until the underrun condition no longer arises, to prevent them being reordered and ensure that the data required first by the master device 10, 20 will be returned first by the memory system 20.

Alternatively, when underrun is detected, this could trigger a signal to the memory system that reordering should be disabled entirely (for any transactions, not just transactions from a particular master or with a particular group ID).

3. The display processor 10 could also trigger an exception condition to cause software to take action. For example, this can trigger software (e.g. a display driver) to reprogram the display processor to disable the grouping of transactions and return to the case when transactions are issued more regularly, or to change the margin amount 90 or the group size 64 for example.

4. Another underrun handling response can be to increase the maximum number of outstanding transactions which are permitted from the display processor 10 at a given time. In order to maintain sufficient quality of service which is fair to each master device, typically each master may be limited to issuing a certain number of outstanding transactions at a time. In this context, an outstanding transaction may be a transaction which has been issued to the memory system but for which the corresponding response (read data or write acknowledgement) has not yet been returned. If the maximum number of transactions are already outstanding, then issuing of any further transactions may be suppressed until a response is received to one of the outstanding transactions (the number of outstanding transactions could be controlled or limited either in the master itself or in an interconnect regulator). In general, each master may have its maximum number of outstanding transactions set according to some fair quality of service scheme, balancing the needs of each master. However, if the display processor 10 detects an underrun or overrun condition then this may trigger a temporary increase in the maximum number of outstanding transactions permitted for the display processor 10 to allow the underrun/overrun condition to be resolved. When underrun or overrun is no longer being detected then the maximum number of outstanding transactions may return to its previous value.

On the other hand, if no underrun or overrun condition is detected at step 110, then at steps 114 and 116 the memory load parameter may be detected and the transaction group size or transaction-issuing threshold varied based on the memory load parameter in the same way as in steps 100 and 102 of FIG. 11. The maximum number of outstanding transactions for the master device 10, 12 could also be varied based on the memory load parameter.

A particular example concerning a read buffer in a display processor 10 is described in the following paragraphs. Performance counters can be implemented per layer/plane, and these performance counters indicate the lowest level that the latency FIFO (first in first out buffer) 40 reaches in a frame. These performance counters may be dual purpose—they could also be used to provide other performance or quality of service information concerning the display processor, as they provide information about the amount of margin in the system.

Scheme 1: Software Configuration

The driver/software reads the layer minimum latency FIFO values, preferably for a number for frames, and for a number of use cases. The minimum latency FIFO level for each layer is determined. The driver/software uses this minimum FIFO level, minus a margin, to specify the programmed burst length, or the number of transactions that should be submitted in a group, or the level that the IFIFO level should reach before transactions are generated. Hence, temporal locality is increased (by performing a group of transactions together, or by performing fewer larger transactions). This increases memory transaction efficiency and reduces power consumption (number of activate commands). This is (effectively) performed by holding off the generation of transactions as shown in FIG. 3. This allows the memory system, interconnect, SDRAM interface and SDRAM to enter low power mode for longer, thereby reducing power consumption. Note that the driver may continually monitor each frames minimum latency FIFO level and update registers accordingly. Also, note that the counter may actually indicate the lowest level that the buffer reaches when all the data for the layer has not been fetched (i.e. the level reached just before fetching in the last piece of data for a layer). Software programmed registers may indicate the maximum or minimum transaction size allowed. Alternatively fixed maximum and minimum sizes could be used.

In the case of underrun, if the latency FIFO level goes below the expected level (minimum latency level minus margin) data is fetched with a default size and fetch threshold, and an interrupt may be generated. In an alternate scheme an interrupt can be triggered if the minimum latency FIFO goes below the margin value. The driver can then be used to program the display processor to disable grouping, or change the amount of margin.

Scheme 2: Hardware Configuration

The above scheme uses the driver to program the minimum allowed latency value. However, over time the memory system use case may change and minimum allowed value will change. Instead, the display processor hardware itself may configure the transaction group size and fetch threshold. The display processor may be programmed so that a specific margin is allowed. Automatically for each frame the minimum latency FIFO level value is subtracted from the margin, and the new latency FIFO tide mark generated. If the minimum latency goes below the margin the display controller fetches transactions normally.

Adaptive Transaction Size to Reduce Underrun

The number of bytes requested from memory can be changed depending on levels of data in internal buffers. When there is sufficient data in internal buffers, data can be requested in short bursts (e.g. 64-bytes per request). Higher latencies caused by inefficient memory access pattern can be tolerated by the block as it has enough data in internal buffers.

When the data levels in internal buffers are about to go critically low, data is requested in bigger bursts (e.g. 256-bytes per request). Although memory system would need to assign more bandwidth to the block, issuing bigger burst request would significantly decrease the chances of block running out of data (i.e. underrun).

Hence, in summary: the following techniques can be used:

1) Adapt display processor transaction size depending upon memory system loading.
   a. When display processor is likely to underrun (potentially identified in QoS logic) the larger transaction size is used, or more outstanding transactions are generated.
   b. When display processor is not likely to underrun, performance counters can be used to determine the lowest level that each layer/planes latency FIFO can reach in a frame.
     i. This information together with a software programmed margin is used to determine:
       1. the most efficient transaction burst length
       2. or the grouping of transactions
     ii. If the latency FIFO goes below the expected level (minimum level–margin).
       1. Transactions are performed as normal (independent of memory load conditions) and
       2. An interrupt may be generated.

2) Software programmes the QoS green (high tide) transaction size and/or number of supported outstanding transactions and the QoS red (low tide) transaction size and/or number of supported outstanding transactions.

3) Software programmes a margin used to determine the most efficient transaction size The technique discussed above can be used for any master device having a read or write buffer, but is particularly useful for uncached masters for which the buffer is a temporary buffer into which data is fetched from memory before it is streamed for processing (e.g. where the processing may be display on a display device or output into a peripheral memory for example). In particular, it is useful in cases where the processing involves a stream of data fetched from storage locations in the memory system which are identified by a sequential series of addresses. As opposed to cached masters which will typically have more random access patterns, with buffering masters for which data is invalidated in the buffer when it is read out for processing, such as the display processor 10 or DMA controller 12, there is typically a more linear addressing scheme where a block of data with sequential addresses is processed sequentially. In this case it is more predictable which data is going to be required in the near future, making the use of larger transaction groups more advantageous. While the technique is particularly useful for a display processor 10 or DMA controller 12 it can be used for other types of masters with latency buffers in a similar way.

As mentioned above, it is possible for the memory system 20 to detect its own system load and output a signal to master devices indicating a parameter that identifies how heavily loaded the memory system is. The signal provided could be a quantitative indication of loads (such as a buffer occupancy level or time taken to service incoming transactions) or a qualitative indication such as a class-based indication of whether current load is low, medium or high for example. For example a one-bit or multi-bit indicator may be provided giving some indication of the level of system load in the memory system 20. This indication could be provided along with transaction responses themselves or by a separate sideband mechanism.

Figure 13:
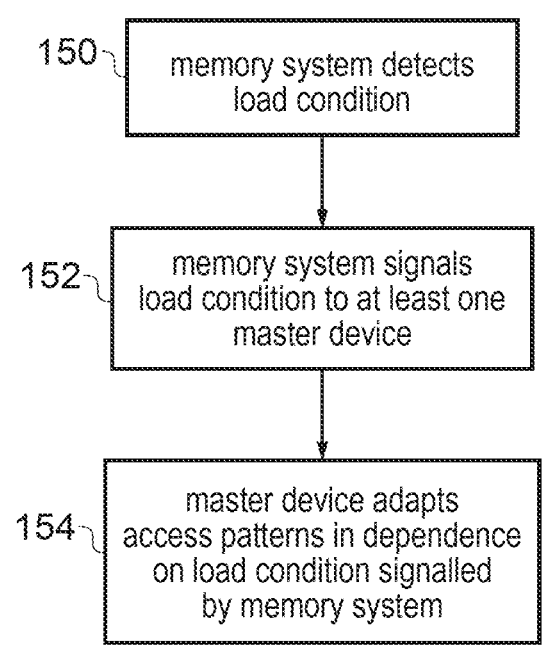
FIG. 13 is a flow diagram illustrating an example in which master devices adapt their access patterns in dependence on a load condition signalled by the memory system.

The technique discussed above of varying transaction grouping size or the transaction-issuing threshold for initiating transactions at a master is one way in which master devices can adapt their access patterns based on the load condition signalled by the memory system. However, there are also other techniques which can be used by the master devices to vary their access patterns to alleviate problems in cases of high system load memory and/or allow greater energy savings in times of low memory load. FIG. 13 shows a general method which can be used. At step 150 the memory system detects its load condition. At step 152 the memory system 20 signals the load condition to at least one master device. At step 154 the master device adapts its access patterns in dependence on the load condition signal by the memory system. This technique is discussed in more detail below.

Memory systems have competing objectives:
to maximise bandwidth
to minimise power consumption
to minimise access latency
to ensure data for real time masters returns within an allotted time.

Quality of service (QoS) schemes are designed to ensure that masters receive data within appropriate bounds. Generally, masters performing larger transactions is more efficient, however this can lead to QoS issues for other masters (if arbitration within a transaction is not supported), and may result in increased rate of underrun as there needs to be space for the returning data in the master—therefore larger bursts mean that the buffer level is lower before a new transaction is performed. Performing smaller transactions is less efficient, however, a master can generate transactions more regularly and there will be fewer fluctuations in buffer level.

DDR4-SDRAM transactions that hit a row that is already open consume less power as an activate command is not required. Grouping transactions together and having larger quiescent periods allows the DDR-SDRAM device to be placed in low power mode for longer, again reducing power consumption. A phase locked loop (PLL) or delay locked loop (DLL) in the DDR-SDRAM typically requires periodic transactions for it to remain locked on. Potentially additional training transactions can be generated to ensure that the PLL/DLL does not lose lock; or lock can be lost and a training sequence can be entered before the next memory request is performed (increasing latency).

These issues can be addressed by allowing the memory system (typically the DDR-SDRAM memory controller 24) to signal to other components in the system its current state, potentially:

Overloaded. Memory controller is receiving a significant number of transactions and average latency is higher than normal.
Normal. Normal loading
Quiescent. Low level of transactions.
Low power. Few transactions.

The memory controllers state can be determined by monitoring its buffer level (in transactions or bytes), min and max data latency, and/or number of QoS escalations over a period of time.

Masters can decide to ignore this information or preferably use this information in a number of ways:
Overloaded Memory System
Memory controller signals that memory system is overloaded. Masters can then potentially:
Eliminate or reduce amount of speculative prefetching; e.g. CPU, GPU.
Reduce bandwidth requirement; e.g. Display Processor 10 fetches every other line and upscales from the frame buffer to generate the frame to be displayed
Power controller could identify masters that are likely to be throughput limited and reduce operating frequency (e.g. DVFS) of certain masters.
Master reduces its memory system load, for example reducing the number of threads in the master or the number of outstanding transactions.
Real time master may perform larger bursts or increase the number of outstanding transactions if latency goal is not met. See Real time masters below.
Alternatively:
The above throttling could be performed in the interconnect—for example in the interconnects AXI/ACE slave interface.
If memory system is heavily loaded the memory controller may request all masters to reduce their loading, or loading reduction request can be performed to a group masters, or to individual masters one at a time.

Real Time Masters

For most modern memory systems and real time masters having high transaction locality (linear addressing patterns), requesting data less than 256 bytes causes external memory access efficiency to decrease. This is because typically, back to back requests have good temporal locality, and reading less-than-recommended data from memory system would cause it to read the same data multiple time, thereby reducing efficiency. However, supporting large read (or write) requests can cause longer waiting periods for other high priority blocks which may be requesting data from memory.

This can be addressed by changing the number of bytes requested from memory depending on levels of data in internal buffers. When there is sufficient data in internal buffers, data is requested in short bursts (e.g. 64-bytes per request). Higher latencies caused by inefficient memory access pattern can be tolerated by the block as it has enough data in internal buffers.

When the data levels in internal buffers are about to go critically low, data is requested in bigger bursts (e.g. 256-bytes per request). Although memory system would need to assign more bandwidth to the block, issuing bigger burst request would significantly decrease the chances of block running out of data (i.e. underrun).

Alternatively the number of outstanding transactions generated by a real time master could be increased.

Quiescent Memory System

Memory controller 24 signals that memory system is underutilized:

Masters can then:

Group together transactions, or perform larger transactions (in both cases wait for its buffer level to drop lower before issuing transactions). This allows the memory system to operate more efficiently.

Clean dirty lines from caches

Perform memory scrubbing (detecting errors by checking error correcting codes associated with stored data)

Perform any pending transactions

For example, the time while memory load is low is utilized to carry out maintenance actions which do not need to be performed at any particular timing, to avoid using bandwidth for such maintenance actions at times when memory load is higher and the maintenance actions would affect the QoS for higher priority transactions which may have a real time requirement.

Low Power Mode

If memory system is quiescent then transactions can be optimised to reduce power consumption:

Masters can then:

Group together transactions, or perform larger transactions (in both cases wait for its buffer level to drop lower before issuing transactions). This allows the memory system to operate more efficiently.

Signalling

Preferably signalling is performed over separate side band signals (separate from the main interface of the interconnect). However an alternate design could use the same interface as the one used for memory transactions themselves, but this can limit when information can be transferred to the times when transactions are performed. Transactions may be performed infrequently therefore these hints would be time bound.

Alternatively the DMC/memory sub-system could generate an interrupt and software can control masters appropriately.

Multiple Masters in Larger Burst Mode

Hence, depending on memory system load, a master can then hold off transaction requests and aggregate bursts of transactions to increase memory system efficiency. However, there may be some issues:

a) Multiple masters may decide to issue larger bursts simultaneously increasing the chance of underrun.

b) If transactions are not performed frequently enough the DDR-SDRAM may need to generate additional transactions to ensure that the phase locked loop is locked on.

That is, there is a possibility that if multiple masters each hold off issuing transactions for a period, then each of the masters may reach the end of their "holding" period at about the same time, leading to multiple transactions being issued from several masters in a short time. As each of the masters has delayed issuing the transactions, their internal buffer occupancy may be lower so that they are now less tolerant to delays in servicing the transactions. This can increase the risk of underrun. To address this issue, the memory controller can monitor the number of masters that enter the mode in which transactions are grouped, and if required can limit the number of masters that group transactions to ensure that the peak bandwidth requirement of the masters does not result in an underrun.

Alternatively, the memory controller could allow any number of masters to enter the large burst mode, but the memory controller can control the timings at which particular masters perform pending transactions by sending specific requests to masters to perform a transfer. Signalling can be performed by:

a) The DMC requests a specific master to perform a transfer b) The DMC requests a specific master to perform a transfer of a certain size or greater c) The DMC requests a group of masters to perform a transfer The Master responds by either:

1) Performing transfer over interface
2) Signalling back that it will perform a transfer
3) Signalling back that it will perform a transfer of a specified size
4) Signalling back that it will not perform a transfer Transaction sizes can be fixed, programmed by software, or controlled by a tie off.

Alternative Design

The QoS state of the memory system (e.g. AXI QoS signals, QoS sideband signals, internal interconnect and DMC QoS state) can be used to determine when to change interconnect or external memory interface frequency.

Summary of Techniques Using Signal of Memory Load from Memory System

1) Memory system/DMC signals to other components/masters its loading/state. Masters can then modify their access patterns depending upon this information.
   a. If memory system is heavily loaded masters may eliminate pre-fetch transactions
   b. If memory system is lightly loaded masters may perform:
      i. Larger transactions/group multiple transactions to improve efficiency
      ii. Perform memory scrubbing
      iii. Write dirty lines from cache etc.

2) Memory system/DMC controller may request masters to perform transactions to ensure:
   a. Peak bandwidth requirement isn't exceeded.
   b. DDR-SDRAM training requests are not generated 3) Master modifies access pattern depending upon memory system loading information.

4) Interface indicating memory system/DMC loading to masters

Another example may provide a master device comprising:

means for buffering data fetched from a memory system; and means for issuing from time to time a group of one or more transactions to request fetching of a block of data from the memory system into the means for buffering; and means for detecting at least one memory load parameter indicative of how heavily loaded the memory system is, and varying a group size of the block of data fetched per group in dependence on said at least one memory load parameter.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

We claim:

1. A master device comprising:
a buffer to store data transferred from a memory system or data to be transferred to the memory system; and
control circuitry to issue, when there is sufficient space in the buffer to store a block of data of size equal to a group size, a group of one or more transactions to request transfer of a block of data having said group size between the memory system and the buffer;
wherein the control circuitry is configured to detect at least one memory load parameter indicative of how heavily loaded the memory system is, and to vary said group size in dependence on said at least one memory load parameter;
wherein the control circuitry is configured to detect whether the at least one memory load parameter indicates one of a first load condition, a second load condition in which the memory system is more heavily loaded than the first load condition, and a third load condition in which the memory system is more heavily loaded than the second load condition; and
when varying the group size in dependence on the at least one memory load parameter, the control circuitry is configured to:
select a smaller group size when detecting the second load condition than when detecting the first load condition, and
select a smaller group size when detecting the second load condition than when detecting the third load condition.

2. The master device according to claim 1, wherein the control circuitry is configured to detect a predetermined buffer occupancy condition comprising one of:
an underrun condition when a buffer occupancy of the buffer drops to or below an underrun threshold; and
an overrun condition when the buffer occupancy of the buffer rises to or above an overrun threshold.

3. The master device according to claim 2, wherein in the presence of said predetermined buffer occupancy condition, the control circuitry is configured to set the group size to a predetermined group size; and
when said predetermined buffer occupancy condition is absent, the control circuitry is configured to vary the group size in dependence on the at least one memory load parameter.

4. The master device according to claim 2, wherein in the presence of said predetermined buffer occupancy condition, the control circuitry is configured to issue transactions specifying an ordering attribute identifying that the transactions specifying said ordering attribute should be serviced by the memory system in the same order that the transactions specifying said ordering attribute are issued by the master device.

5. The master device according to claim 2, wherein the control circuitry is configured to trigger an exception condition in response to detecting said predetermined buffer occupancy condition.

6. The master device according to claim 1, wherein the control circuitry is configured to issue a next group of one or more transactions in response to detecting one of:
a buffer occupancy of the buffer reaching or passing beyond a transaction-issuing threshold level; or
data being read out from or written to the buffer which has a relative position within a predetermined structural unit of data equal to a transaction-issuing threshold position.

7. The master device according to claim 6, wherein when varying the group size in dependence on said at least one memory load parameter, the control circuitry is configured to vary the transaction-issuing threshold level or transaction-issuing threshold position in dependence on said at least one memory load parameter.

8. The master device according to claim 1, wherein the control circuitry is configured to suppress issuing of further transactions when a maximum number of outstanding transactions issued by the master device are still outstanding; and
the control circuitry is configured to vary said maximum number of outstanding transactions in dependence on said at least one memory load parameter.

9. The master device according to claim 1, wherein the control circuitry is configured to vary the group size between a minimum allowable group size and a maximum allowable group size.

10. The master device according to claim 9, wherein at least one of the minimum allowable group size and the maximum allowable group size is programmable by software.

11. The master device according to claim 1, wherein the control circuitry is configured to vary the group size by varying a size of a portion of data transferred per transaction in the group.

12. The master device according to claim 1, wherein the control circuitry is configured to vary the group size by varying a number of transactions issued in the group.

13. The master device according to claim 1, comprising a read buffer to store data transferred from a memory system, and a write buffer to store data to be transferred to the memory system;
wherein the control circuitry is configured to issue within a same group of transactions both read transactions requesting reading of data from the memory system to the read buffer and write transactions requesting writing of data from the write buffer to the memory system.

14. The master device according to claim 1, wherein the at least one memory load parameter comprises a signal received from the memory system indicative of how heavily loaded the memory system is.

15. The master device according to claim 1, wherein the at least one memory load parameter comprises a time between issuing a transaction to the memory system and receiving the data from the memory system in response to the transaction.

16. The master device according to claim 1, wherein the at least one memory load parameter is dependent on a minimum or maximum buffer occupancy of the buffer reached during a predetermined period.

17. The master device according to claim 16, wherein the control circuitry is configured to vary the group size in dependence on the minimum or maximum buffer occupancy and a margin amount.

18. The master device according to claim 17, wherein the margin amount is programmable by software.

19. The master device according to claim 17, wherein the control circuitry is configured to trigger an exception condition in response to the buffer occupancy dropping to or below the margin amount, or in response to an amount of spare buffer capacity dropping to or below the margin amount.

20. The master device according to claim 16, wherein the control circuitry is configured to trigger an exception condition in response to the buffer occupancy reaching or passing beyond a previous minimum or maximum buffer occupancy.

21. The master device according to claim 1, wherein the master device is configured to process a stream of data fetched from storage locations in the memory system identified by a sequential series of addresses.

22. The master device according to claim 1, wherein the master device comprises a display processor to control display of image data on a display device based on the data in the buffer.

23. The master device according to claim 1, wherein the master device comprises a direct memory access controller to control output of data from the buffer to a memory or a peripheral device.

24. An apparatus comprising:
the master device of claim 1; and
said memory system.

25. A method for controlling a master device comprising a buffer for storing data transferred from a memory system or data to be transferred to the memory system, for which data is transferred between the buffer and the memory system in groups of one or more transactions, the method comprising:

when there is sufficient space in the buffer to store a block of data of size equal to a group size, using control circuitry to issue a group of one or more transactions to request transfer of a block of data having said group size between the memory system and the buffer;

detecting, using the control circuitry, at least one memory load parameter indicative of how heavily loaded the memory system is; and varying, using the control circuitry, said group size in dependence on said at least one memory load parameter;

wherein the detecting comprises detecting, using the control circuitry, whether the at least one memory load parameter indicates one of a first load condition, a second load condition in which the memory system is more heavily loaded than the first load condition, and a third load condition in which the memory system is more heavily loaded than the second load condition; and the varying comprises:
  selecting, using the control circuitry, a smaller group size when the second load condition is detected than a group size selected when the first load condition is detected, and
  selecting, using the control circuitry, a smaller group size when the second load condition is detected than a group size selected when the third load condition are detected.

26. The method of claim 25, comprising setting, using the control circuitry, a group size defining value in a control storage location in dependence on said at least one memory load parameter, the group size defining value specifying the group size to be used by the master device for each group of transactions.

27. A non-transitory recording medium storing a computer program for controlling the control circuitry to perform the method of claim 25.

* * * * *